(12) United States Patent
Zhang et al.

(10) Patent No.: US 9,933,574 B1
(45) Date of Patent: Apr. 3, 2018

(54) WAVEGUIDE-LAST SILICON PHOTONIC OPTICAL CONNECTOR ASSEMBLY

(71) Applicant: Oracle International Corporation, Redwood Shores, CA (US)

(72) Inventors: Chaoqi Zhang, Atlanta, GA (US); Hiren D. Thacker, San Diego, CA (US); Xuezhe Zheng, San Diego, CA (US); Ashok V. Krishnamoorthy, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/388,200

(22) Filed: Dec. 22, 2016

(51) Int. Cl.
| | |
|---|---|
| *G02B 6/30* | (2006.01) |
| *G02B 6/42* | (2006.01) |
| *B29C 65/48* | (2006.01) |
| *B29C 65/16* | (2006.01) |
| *B29L 11/00* | (2006.01) |

(52) U.S. Cl.
CPC ............ *G02B 6/30* (2013.01); *B29C 65/16* (2013.01); *B29C 65/48* (2013.01); *G02B 6/4214* (2013.01); *G02B 6/4224* (2013.01); *G02B 6/4239* (2013.01); *B29L 2011/00* (2013.01)

(58) Field of Classification Search
CPC ...... G02B 6/30; G02B 6/4239; G02B 6/4214; G02B 6/4224; B29C 65/16; B29C 65/48; B29L 2011/00
See application file for complete search history.

(56) References Cited

U.S. PATENT DOCUMENTS 9,594,220 B1 * 3/2017 Sutherland ............ G02B 6/125

OTHER PUBLICATIONS

Usconec: "The Leader in Novel, High Density, Passive Optical Interconnect Components", downloaded from http://www.usconec.com/products/ferrules/mt-ferrule-kits.htm on Jan. 13, 2017.
Yao, et al., "Grating-coupler based low-loss optical interlayer coupling," in Proc. 8th IEEE Int. Conf. Group IV Photon. (GFP), Sep. 2011,pp. 383-385.
Lindenmann et al., "Photonic wire bonding: a novel cncept for chip-scale interconnects," Optics Express, vol. 20, No. 16, pp. 17667-17677, Jul. 2012.

(Continued)

*Primary Examiner* — John M Bedtelyon
(74) *Attorney, Agent, or Firm* — Park, Vaughan, Fleming & Dowler LLP (57) ABSTRACT

The disclosed embodiments relate to a system for assembling an optical connector. During the assembly process, the system first fabricates the optical connector, wherein the optical connector is precut and includes a fiber coupler for connecting to an external optical fiber. Next, the system bonds the optical connector to a photonic chip, wherein the photonic chip includes an optical coupler, which is coupled to one or more optical components within the photonic chip. Finally, after the optical connector is bonded to the photonic chip, the system uses a laser to write a coupling waveguide in the optical connector, wherein the coupling waveguide is routed through the optical connector to connect the optical coupler in the photonic chip with the fiber coupler for connecting to the external optical fiber.

10 Claims, 8 Drawing Sheets

(56) References Cited

OTHER PUBLICATIONS

Choudhury, et al., "Ultrafast laser inscription of 3D components for spatially multiplexed telecommunications," in Workshop on Specialty Optical Fibers and Their Applications, OSA Technical Digest (online) (Optical Society of America, 2015), paper WF3A.3.
OPTOSCRIBE "3D Waveguide Technology for Optical Communication" downloaded from http://www.optoscribe.com/products/ on Jan. 5, 2017.

* cited by examiner

FIG. 1
(PRIOR ART)

1. Optical connector substrate fabrication

2. Waveguide formation

3. Optical connector bonding

FIG. 2A
(PRIOR ART)

1. Optical connector substrate fabrication

2. Optical connector substrate bonding on photonic chip

3. Waveguide formation

WAVEGUIDE-LAST SILICON PHOTONIC OPTICAL CONNECTOR ASSEMBLY

GOVERNMENT LICENSE RIGHTS

This invention was made with U.S. government support under Agreement No. HR0011-08-9-0001 awarded by DARPA. The U.S. government has certain rights in the invention.

FIELD

The disclosed embodiments generally relate to the design of optoelectronic circuits. More specifically, the disclosed embodiments relate to a new technique for assembling a photonic optical connector.

RELATED ART

Figure 1:
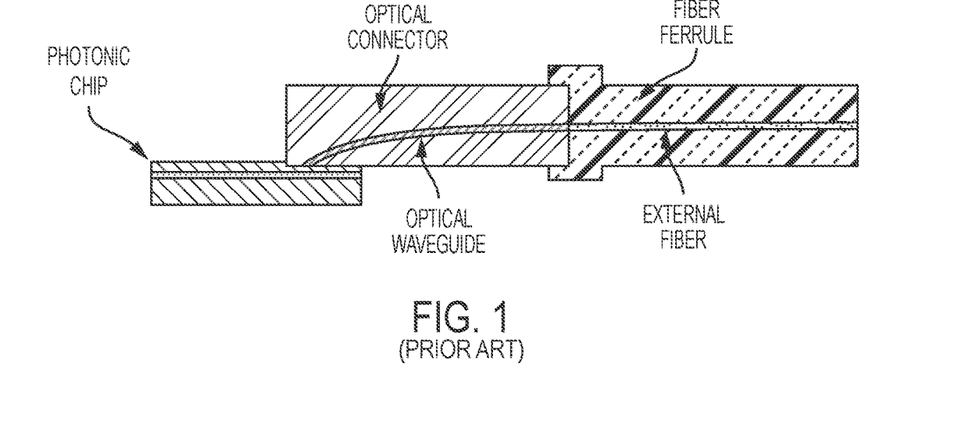
FIG. 1 illustrates an optical connector containing an optical waveguide in accordance with the disclosed embodiments.

Silicon photonics is a promising new technology that can potentially provide large communication bandwidth, low latency and low power consumption for inter-chip and intra-chip connections. In order for silicon photonics to be widely adopted, practical manufacturing techniques need to be developed to assemble silicon photonic circuits. One challenge is to develop a practical technique for manufacturing an optical connector that couples an optical signal from optical components in a silicon photonic chip to an external optical fiber. The task of assembling this type of connection poses a significant challenge because of the micron-scale alignment that is required between the optical connector and the silicon photonic chip, and related issues involving handling of optical fibers. A promising approach to overcoming these issues is to use a passive optical connector, which is intimately coupled to the on-chip optical I/O ports (such as diffraction grating couplers) on one end and presents a low-loss, industry-standard opto-mechanical interface to a fiber array ferrule on the other end. (See FIG. 1.) In this approach, the assembly requirements are reduced to accurate placement of the passive optical connector on the silicon photonic die, which enables an external optical fiber to be attached during a subsequent system-assembly operation.

It has been reported that as little as 2 μm of misalignment between the on-chip grating coupler and the optical fibers can cause 1 dB or more in excess loss depending on the design of the passive optical connector. (See J. Yao, et al., "Grating-coupler based low-loss optical interlayer coupling," in Proc. 8th IEEE Int. Conf. Group IV Photon. (GFP), September 2011, pp. 383-385.) Because of this misalignment problem, it is common industry practice to use active alignment techniques, wherein each component is mounted using high-accuracy six-axis stages, and the optimal relative position is determined by maximizing a reference optical loopback signal. While this type of active-alignment technique can indeed achieve high-accuracy alignment, it involves a time-consuming and low-throughput process, which requires specialized equipment.

Instead of using this active-alignment technique, the assembly process can alternatively be performed through a passive alignment technique, which makes use of fiducials and a pattern-recognition system in a flip-chip bonder, without requiring any optical feedback. But, again, this creates a cost-accuracy tradeoff. While sub-micron alignment-capable bonders do exist, they are prohibitively expensive to acquire and maintain, and few are even capable of high-throughput manufacturing. In addition, it is typical for semiconductor packages to undergo subsequent mechanical and environmental testing, and this subsequent testing may be detrimental to the optical alignment unless steps are taken to secure the optical alignment.

Hence, what is needed is a practical technique for aligning on-chip optical waveguides with external optical fibers without the drawbacks of existing techniques.

SUMMARY

The disclosed embodiments relate to a system for assembling an optical connector. During the assembly process, the system first fabricates the optical connector, wherein the optical connector is precut and includes a fiber coupler for connecting to an external optical fiber. Next, the system bonds the optical connector to a photonic chip, wherein the photonic chip includes an optical coupler, which is coupled to one or more optical components within the photonic chip. Finally, after the optical connector is bonded to the photonic chip, the system uses a laser to write a coupling waveguide in the optical connector, wherein the coupling waveguide is routed through the optical connector to connect the optical coupler in the photonic chip with the fiber coupler for connecting to the external optical fiber.

In some embodiments, using the laser to write the coupling waveguide includes using a femtosecond laser-direct writing process to write the coupling waveguide in the optical connector.

In some embodiments, using the laser to write the coupling waveguide involves: (1) determining a start-point for the coupling waveguide based on a measured misalignment between one or more prefabricated fiducials on the photonic chip and the optical connector; (2) determining an end-point for the coupling waveguide based on a waveguide end-mark to ensure that a position of the end-point for the coupling waveguide matches one or more prefabricated external fiber alignment features; and (3) using the laser to write the coupling waveguide between the start-point and the end-point within the optical connector.

In some embodiments, a path of the coupling waveguide through the optical connector is routed to reflect off of a mirror, which is incorporated into a substrate of the optical connector.

In some embodiments, bonding the optical connector to the photonic chip involves using: a flip-chip bonding machine; or a pick-and-place tool and a mass reflow process.

In some embodiments, bonding the optical connector to the photonic chip involves: adhesive-assisted bonding; solder-assisted bonding; or mechanical clamping.

In some embodiments, the optical components within the photonic chip include one or more of the following: an optical modulator; an optical multiplexer; an optical demultiplexer; a photodetector; an optical waveguide; and the fiber coupler.

In some embodiments, fabricating the optical connector includes incorporating one or more passive optical devices into the optical connector substrate.

In some embodiments, the one or more passive optical devices include one or more of the following: a mirror; a lens; and a mechanical alignment feature.

In some embodiments, the optical coupler in the photonic chip comprises a spot-size converter, or a diffraction grating coupler

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

We have developed a new "waveguide-last" optical connector assembly technique. In this new technique, the ultra-accurate flip-chip bonding process, which is typically used for optical connector attachment, is replaced by a two-step process. The first step involves coarse alignment (e.g., within several microns) and bonding of a pre-cut connector substrate to a photonic chip through a flip-chip bonding process, which is not so accurate. After the connector substrate is bonded to the photonic chip, the second step involves using a laser to write a coupling waveguide in the optical connector, wherein the coupling waveguide connects the optical coupler in the photonic chip with an external optical fiber. While writing the coupling waveguide, this technique calculates misalignment-correction routes to ensure that the coupling waveguide is well-aligned with photonic chip I/Os and the external optical fibers.

This waveguide-last assembly technique uses a femtosecond laser-direct writing process, which has proven to be a viable approach for writing three-dimensional waveguides and other passive photonic devices in glass substrates. (See D. Choudhury, et al., "Ultrafast laser inscription of 3D components for spatially multiplexed telecommunications," in Workshop on Specialty Optical Fibers and Their Applications, OSA Technical Digest, Optical Society of America, 2015, paper WF3A.3.) This femtosecond laser-direct writing process eliminates the need for traditional lithography, etching, and other microfabrication operations to produce passive optical structures. Moreover, these femtosecond laser-direct writing tools have remarkable nanoscale resolution and fast writing speeds (10 s of mm/s).

DETAILED DESCRIPTION

Figure 2A:
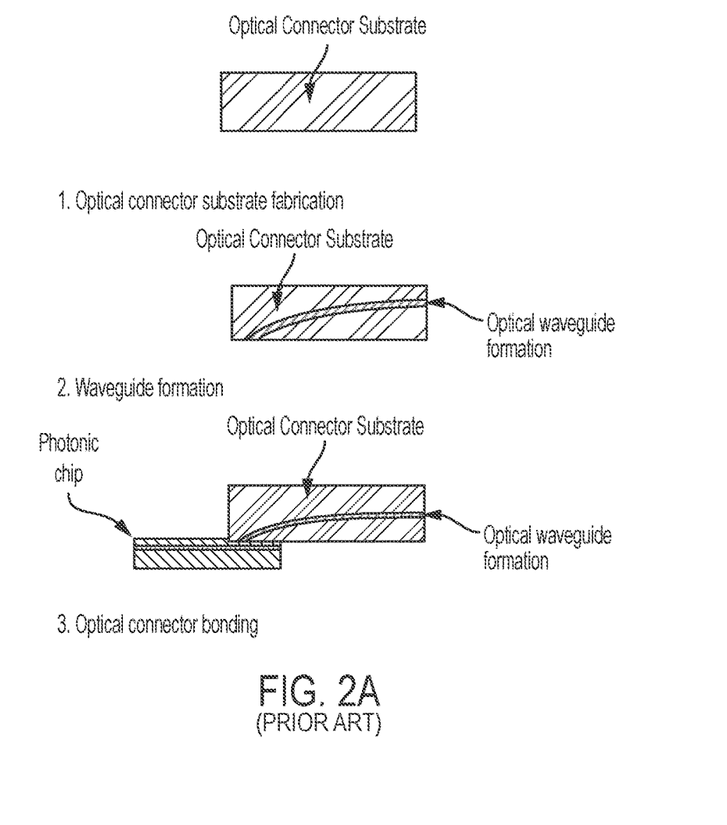
FIG. 2A illustrates a waveguide-first technique for assembling an optical connector in accordance with the disclosed embodiments.

A conventional "waveguide-first" optical connector assembly technique is illustrated in FIG. 2A. As the name suggests, the optical waveguide and other passive devices are first fabricated in the connector substrate. This prefabricated connector substrate is then flip-chip bonded onto a photonic chip. However, as previously discussed, achieving ultra-accurate alignment (≤1 µm) using this type of flip-chip bonding process is extremely expensive, provides only low throughput, and is subject to potential misalignment during subsequent electrical packaging operations.

To overcome these disadvantages, we have developed a misalignment-tolerant "waveguide-last" optical connector assembly technique. This waveguide-last assembly technique employs standard (non-specialty) high-throughput flip-chip bonders. For example, such high-throughput flip-chip bonders can provide alignment resolutions of 3 µm or greater.

Figure 2B:
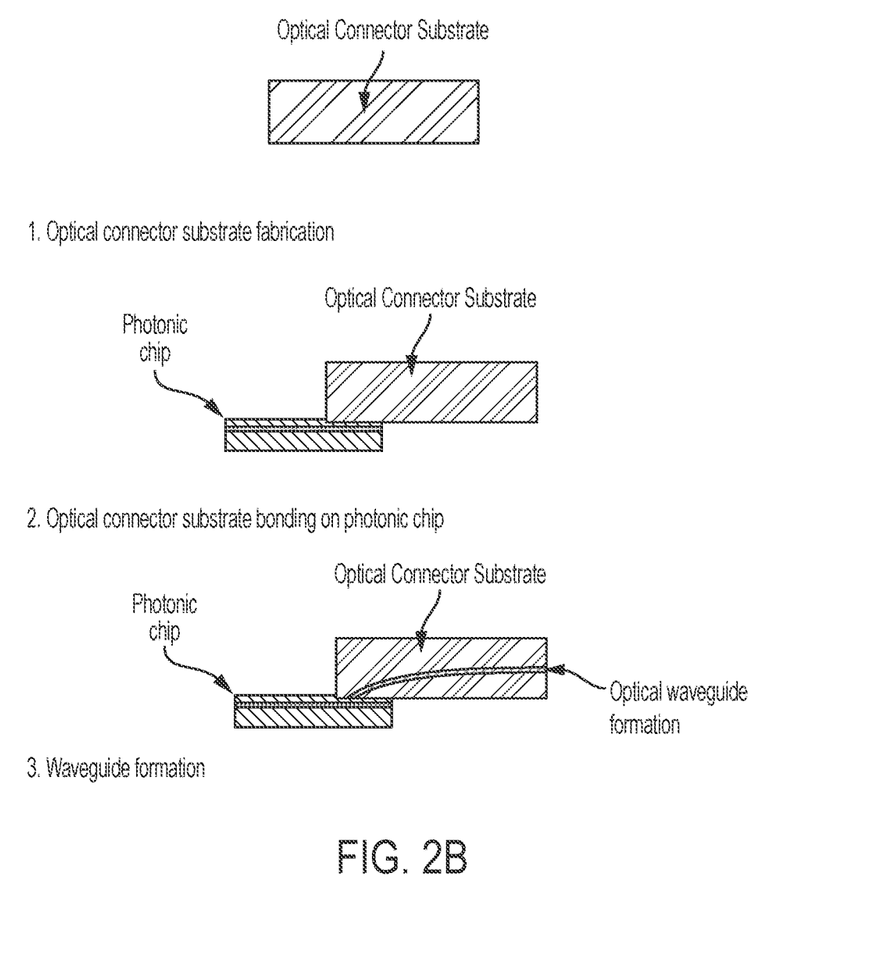
FIG. 2B illustrates a waveguide-last technique for assembling an optical connector in accordance with the disclosed embodiments.

An exemplary waveguide-last optical connector assembly process is illustrated in FIG. 2B. First, a precut optical connector substrate without any coupling waveguide is fabricated. For example, an exemplary optical connector substrate can be manufactured on a thin (0.25 µm) or a thick (3 µm) SOI technology platform. This optical connector substrate may contain passive optical devices such as mirrors, lenses, mechanical alignment features, and more. (However, it does not yet include the routing waveguide for coupling the photonic chip with the optical fiber.) Note that this optical connector substrate may be wafer-level or panel-level fabricated and then singulated. Moreover, the material that comprises the optical connector substrate may include a glass, a polymer or any other material that can be processed using the following waveguide-writing steps.

Next, the optical connector substrate is face-to-face bonded with the photonic chip. Because there is no waveguide-alignment involved in this step, the required alignment accuracy (which is on the order of several microns) is not as precise as the ultra-fine alignment accuracy required for the waveguide-first flip-chip bonding process illustrated in FIG. 2A. This relatively coarse alignment and bonding process can be accomplished using a high-throughput, flip-chip bonder, or alternatively using a pick-and-place tool with a mass reflow process. Note that the bonding mechanism can comprise adhesive-assisted bonding (for example, using a UV-cured or thermally cured adhesive), solder-assisted bonding (for example, using AuSn solder or SnAg solder), or mechanical clamping. Also, the photonic chip may include a number of different types of optical components, such as modulators, multiplexers, demultiplexers, photodetectors, waveguides and fiber couplers. The photonic chip may also include monolithically integrated electronic circuits.

The last step in the waveguide-last assembly process is to use a laser to write the waveguides in the optical connector substrate to connect on-chip optical couplers (IOs) in the photonic chip to passive optical devices or fiber couplers in the optical connector. Note that this writing process requires knowledge of the precise position of the optical couplers on the photonic chip after the precut connector substrate is bonded to the photonic chip. Also, techniques such as a femtosecond laser-direct writing process may be used to write the waveguide. Details of the waveguide-routing computations and the associated writing process are discussed in more detail below.

Improvements and Benefits

Compared with the conventional waveguide-first assembly process illustrated in FIG. 2A, this waveguide-last assembly process provides a number of improvements and benefits.

In particular, high-throughput and low-cost assembly can be achieved by eliminating the expensive and cumbersome ultra-accurate flip-chip bonding operation. In the waveguide-last assembly process, this ultra-accurate flip-chip bonding process is replaced by a low-cost, two-step process, which involves: bonding a precut connector substrate onto a photonic chip using a standard flip-chip process, and then writing one or more coupling waveguides in the optical connector. By using this two-step process, the alignment required for the connector-to-photonic-chip attachment operation can be relaxed to several microns, thereby allowing use of standard high-throughput flip-chip equipment and a mass-reflow process.

The waveguide-last assembly process also mitigates coupling misalignment induced by coefficient of thermal expansion (CTE) mismatches between the optical connector and photonic chip. As shown in FIG. 2A, during the waveguide-first assembly process, the alignment and flip-chip bonding operation is performed at bonding temperature, which is 250° C. for SnAg solder and 280° C. for AuSn solder. However, the resulting optical system operates at 30° C. to 80° C., which is about 200° C. lower than the alignment and bonding temperatures. Hence, if there is a coefficient of thermal expansion (CTE) mismatch between the optical connector material and the photonic chip material, this large temperature difference may cause a significant misalignment at operating temperatures, even if the optical connector was well-aligned with the optical chip during the bonding process. In contrast, during the waveguide-last assembly process, the waveguide writing operation is performed at room temperature after the optical-connector-to-optical-chip bonding operation, and room temperature is very close to the operating temperature of the optical system. Hence, by using the waveguide-last assembly process, the CTE-mismatch-induced coupling misalignment can be reduced significantly.

Figure 3:
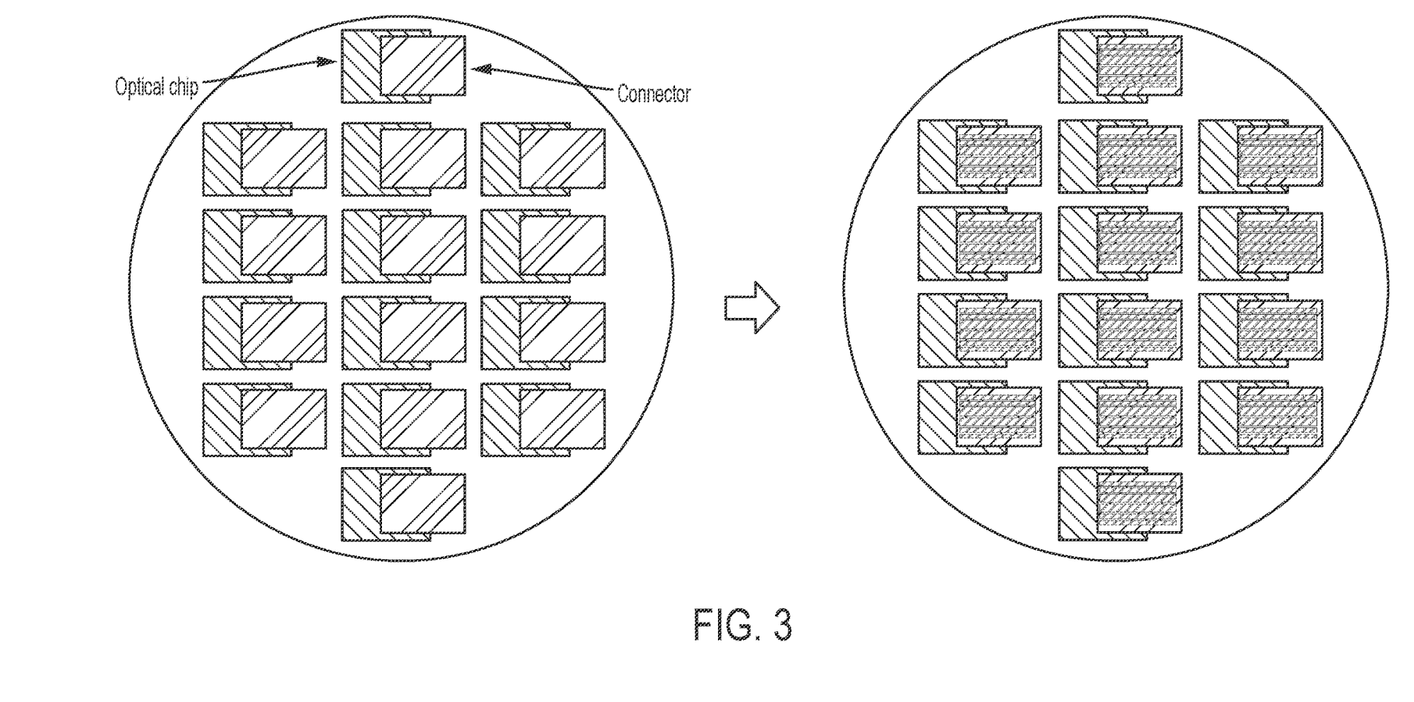
FIG. 3 illustrates a large-scale, wafer-level, waveguide-last optical connector assembly in accordance with the disclosed embodiments.

The waveguide-last assembly technique is also compatible with a large-scale wafer-level assembly process, which may lower assembly costs and increase process throughput. For example, as illustrated on the left-hand side of FIG. 3, during a large-scale wafer-level assembly process, pre-cut optical connector substrates are first bonded with photonic chips through die-to-wafer bonding (or through pick-and-place assembly plus mass reflow techniques). Note that the wafer substrate, which includes photonic chips, may be a photonic wafer or a reconstructed molded wafer. Next, a waveguide-last writing operation is performed on each connector, as is illustrated on the right-hand side of FIG. 3.

Details and Variations

Figure 4:
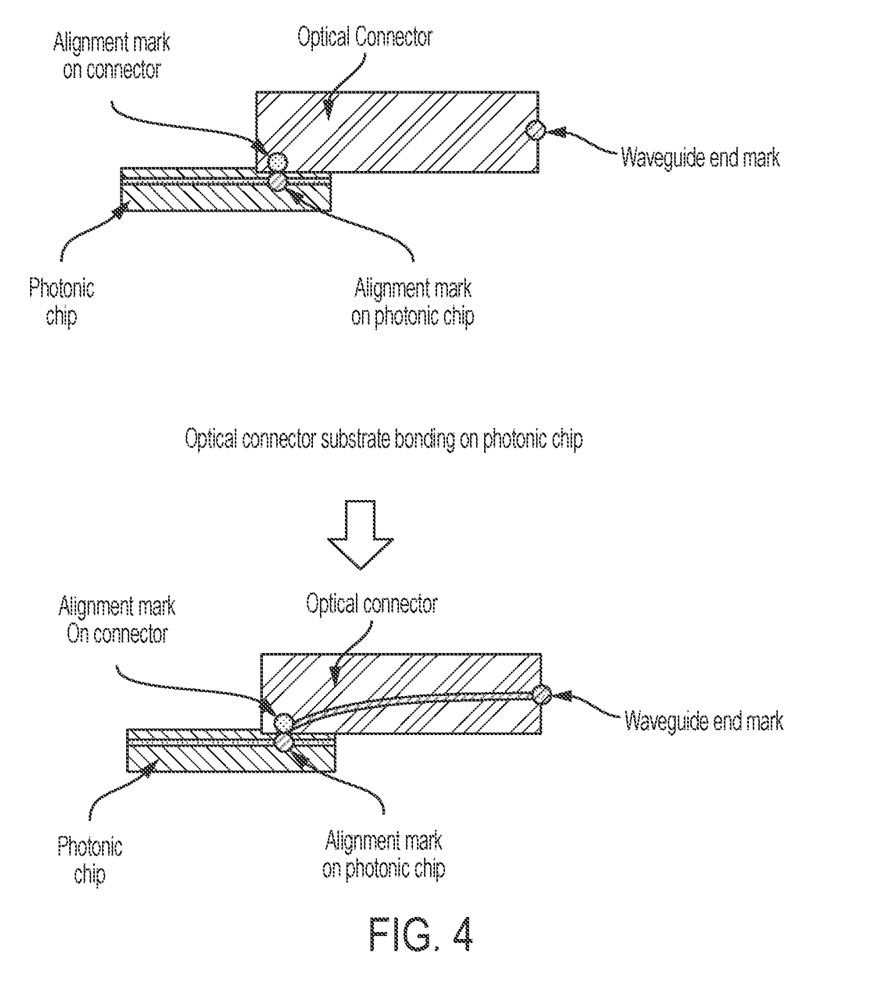
FIG. 4 illustrates a waveguide-last technique for assembling an optical connector based in alignment marks in accordance with the disclosed embodiments.

We now describe a number of details and variations of the waveguide-last assembly process. As shown in FIG. 2B, it is important to compute the correct path for the coupling waveguide before writing the coupling waveguide in the optical connector to ensure low-loss coupling between the optical couplers in the photonic chip and the external optical fibers. The required information for the waveguide writing process includes the start-point position, the path of the incident light vector, and the end-point position. As shown in FIG. 4, this can be computed based on a measured misalignment between prefabricated fiducials (not shown) on the photonic chip and the optical connector substrate. For example, complementary Vernier patterns on the photonic chip and the optical connector substrate can be read by using an automated machine-vision system to measure this misalignment. Note that the waveguide start-point information is computed based on the fiducials located close to the connector/chip coupling area. In contrast, the waveguide end-point is computed based on a waveguide end-mark to ensure the waveguide output-point matches prefabricated external fiber alignment features. The system then computes the routing path for the coupling waveguide through the optical connector, and finally the laser is used to write the coupling waveguide.

Figure 5:
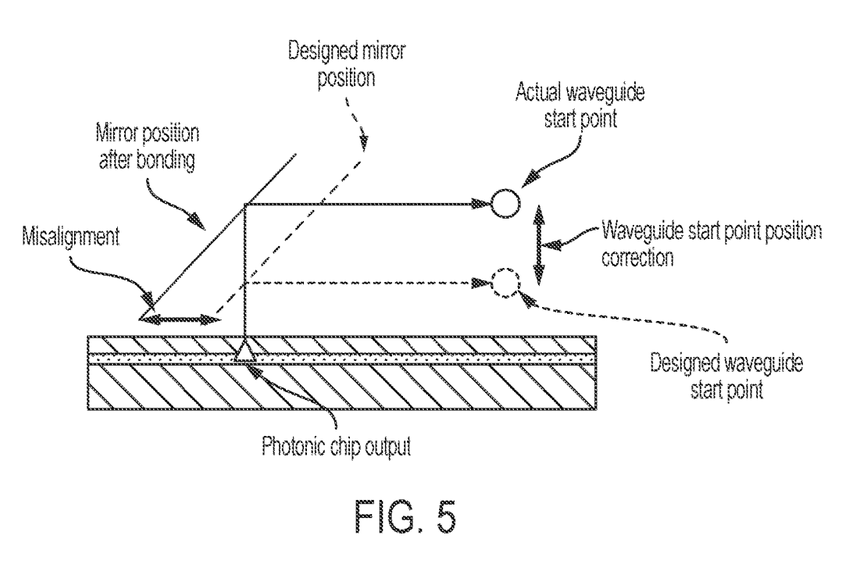
FIG. 5 illustrates a waveguide start-point correction process in accordance with the disclosed embodiments.

The type of information that is required to perform the waveguide start-point computation depends on the coupling mechanism. For example, if the waveguide is directly coupled with photonic chip's optical couplers (IOs), fiducials located on photonic chip by themselves may be sufficient. However, if the waveguide is not directly coupled with the photonic chip's optical couplers, for example if the coupling involves a reflection mirror as is illustrated in FIG. 5, alignment marks on both the optical connector and the photonic chip are required for the waveguide start-point computation. As shown in FIG. 5, the reflected light propagation vector and the associated emission position vary with the reflection mirror position after the connector-bonding step.

An exemplary alignment-correction operation proceeds as follows. First, the system measures the misalignment (in both the in-plane lateral position and rotation) between the optical connector substrate and the photonic chip. Next, the system computes a waveguide start-point correction value based on the misalignment data and the mirror angle. The system then determines the final waveguide start-point position and the incident angle of the light based on the computed correction value. This process is described in more detail below with reference to the flow chart that appears in FIG. 7.

Assembly Process

Figure 6:
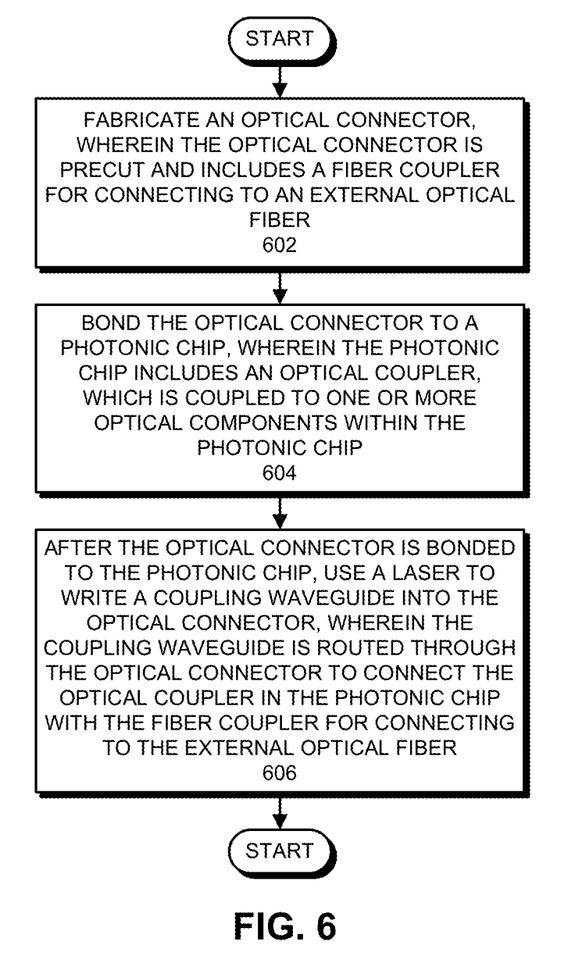
FIG. 6 presents a flow chart illustrating the waveguide-last technique for assembling an optical connector in accordance with the disclosed embodiments.

FIG. 6 presents a flow chart illustrating the waveguide-last technique for assembling an optical connector in accordance with the disclosed embodiments. During the assembly process, the system first fabricates the optical connector, wherein the optical connector is precut and includes a fiber coupler for connecting to an external optical fiber (step 602). Next, the system bonds the optical connector to a photonic chip, wherein the photonic chip includes an optical coupler, which is coupled to one or more optical components within the photonic chip (step 604). Finally, after the optical connector is bonded to the photonic chip, the system uses a laser to write a coupling waveguide in the optical connector, wherein the coupling waveguide is routed through the optical connector to connect the optical coupler in the photonic chip with the fiber coupler for connecting to the external optical fiber (step 606).

Figure 7:
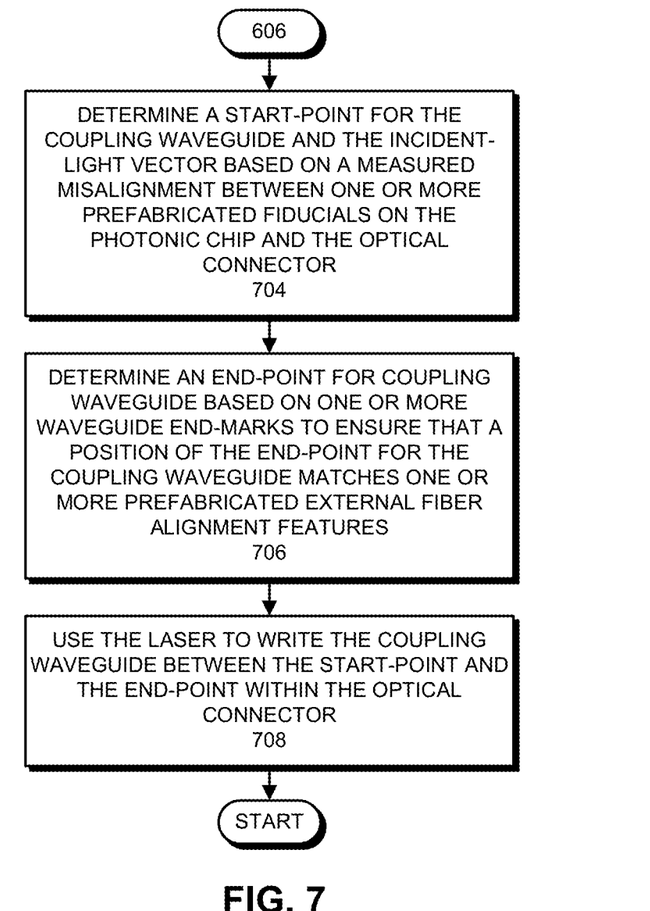
FIG. 7 presents a flow chart illustrating waveguide path-computation and formation processes in accordance with the disclosed embodiments.

FIG. 7 presents a flow chart illustrating additional details of the waveguide-writing process from step 606 above in accordance with the disclosed embodiments. The system first determines a start-point for the coupling waveguide and the incident-light vector based on a measured misalignment between one or more prefabricated fiducials on the photonic chip and the optical connector (step 704). Next, the system determines an end-point for the coupling waveguide based on one or more waveguide end-marks to ensure that a position of the end-point for the coupling waveguide matches one or more prefabricated external fiber alignment features (step 706). Next, the system uses the laser to write the coupling waveguide between the start-point and the end-point within the optical connector (step 708).

System

Figure 8:
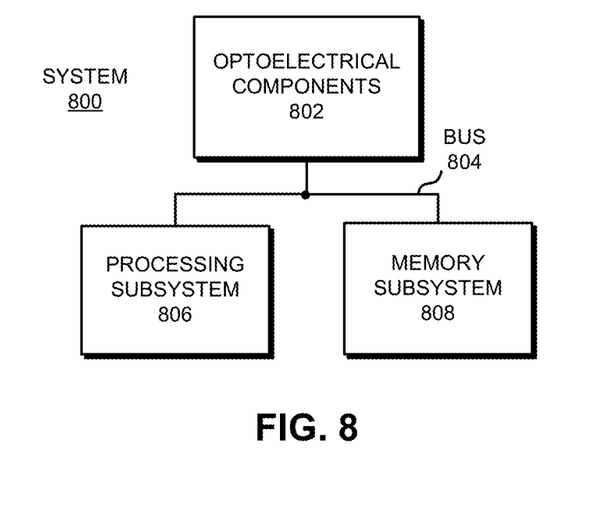
FIG. 8 illustrates a system that incorporates optical components with semiconductor chips in accordance with an embodiment of the present disclosure.

One or more of the preceding embodiments of the waveguide-last optical connector assembly may be included in a system or device. More specifically, FIG. 8 illustrates a system 800 that includes optoelectrical components 802 including a number of waveguide-last optical connector assemblies. System 800 also includes a processing subsystem 806 (with one or more processors) and a memory subsystem 808 (with memory).

In general, system 800 may be implemented using a combination of hardware and/or software. Thus, system 800 may include one or more program modules or sets of instructions stored in a memory subsystem 808 (such as DRAM or another type of volatile or non-volatile computer-readable memory), which, during operation, may be executed by processing subsystem 806. Furthermore, instructions in the various modules in memory subsystem 808 may be implemented in: a high-level procedural language, an object-oriented programming language, and/or in an assembly or machine language. Note that the programming language may be compiled or interpreted, e.g., configurable or configured, to be executed by the processing subsystem.

Components in system 800 may be coupled by signal lines, links or buses, for example bus 804. These connections may include electrical, optical, or electro-optical communication of signals and/or data. Furthermore, in the preceding embodiments, some components are shown directly connected to one another, while others are shown connected via intermediate components. In each instance, the method of interconnection, or "coupling," establishes some desired communication between two or more circuit nodes, or terminals. Such coupling may often be accomplished using a number of photonic or circuit configurations, as will be understood by those of skill in the art; for example, photonic coupling, AC coupling and/or DC coupling may be used.

In some embodiments, functionality in these circuits, components and devices may be implemented in one or more: application-specific integrated circuits (ASICs), field-programmable gate arrays (FPGAs), and/or one or more digital signal processors (DSPs). Furthermore, functionality in the preceding embodiments may be implemented more in hardware and less in software, or less in hardware and more in software, as is known in the art. In general, system 800 may be at one location or may be distributed over multiple, geographically dispersed locations.

System 800 may include: a switch, a hub, a bridge, a router, a communication system (such as a wavelength-division-multiplexing communication system), a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a tablet computer, a supercomputer, a network-attached-storage (NAS) system, a storage-area-network (SAN) system, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device or a portable electronic device, a personal organizer, and/or another electronic device.

Moreover, the optoelectrical components 802 can be used in a wide variety of applications, such as: communications (for example, in a transceiver, an optical interconnect or an optical link, such as for intra-chip or inter-chip communication), a radio-frequency filter, a bio-sensor, data storage (such as an optical-storage device or system), medicine (such as a diagnostic technique or surgery), a barcode scanner, metrology (such as precision measurements of distance), manufacturing (cutting or welding), a lithographic process, data storage (such as an optical-storage device or system) and/or entertainment (a laser light show).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for assembling an optical connector, comprising:
    fabricating the optical connector, wherein the optical connector is precut and includes a fiber coupler for connecting to an external optical fiber;
    bonding the optical connector to a photonic chip, wherein the photonic chip includes an optical coupler, which is coupled to one or more optical components within the photonic chip; and
    after the optical connector is bonded to the photonic chip, using a laser to write a coupling waveguide in the optical connector, wherein the coupling waveguide is routed through the optical connector to connect the optical coupler in the photonic chip with the fiber coupler for connecting to the external optical fiber.

2. The method of claim 1, wherein using the laser to write the coupling waveguide includes using a femtosecond laser-direct writing process to write the coupling waveguide in the optical connector.

3. The method of claim 1, wherein using the laser to write the coupling waveguide includes:
   determining a start-point for the coupling waveguide based on a measured misalignment between one or more prefabricated fiducials on the photonic chip and the optical connector;
   determining an end-point for the coupling waveguide based on a waveguide end-mark to ensure that a position of the end-point for the coupling waveguide matches one or more prefabricated external fiber alignment features; and
   using the laser to write the coupling waveguide between the start-point and the end-point within the optical connector.

4. The method of claim 1, wherein a path of the coupling waveguide through the optical connector is routed to reflect off of a mirror, which is incorporated into a substrate of the optical connector.

5. The method of claim 1, wherein bonding the optical connector to the photonic chip involves using one or more of the following:
   a flip-chip bonding machine; and
   a pick-and-place tool and a mass reflow process.

6. The method of claim 1, wherein bonding the optical connector to the photonic chip involves one or more of the following:
   adhesive-assisted bonding;
   solder-assisted bonding; and
   mechanical clamping.

7. The method of claim 1, wherein the optical components within the photonic chip include one or more of the following:
   an optical modulator;
   an optical multiplexer;
   an optical demultiplexer;
   a photodetector;
   an optical waveguide; and
   the fiber coupler.

8. The method of claim 1, wherein fabricating the optical connector includes incorporating one or more passive optical devices into the optical connector.

9. The method of claim 8, wherein the one or more passive optical devices include one or more of the following:
   a mirror;
   a lens; and
   a mechanical alignment feature.

10. The method of claim 1, wherein the optical coupler in the photonic chip comprises one of:
   a spot-size converter; and
   a diffraction grating coupler.

* * * * *

UNITED STATES PATENT AND TRADEMARK OFFICE
CERTIFICATE OF CORRECTION

PATENT NO. : 9,933,574 B1
APPLICATION NO. : 15/388200
DATED : April 3, 2018
INVENTOR(S) : Zhang et al.

Page 1 of 1

It is certified that error appears in the above-identified patent and that said Letters Patent is hereby corrected as shown below:

In the Specification

In Column 2, Line 61, after "coupler" insert -- . --.

Signed and Sealed this
Fourth Day of September, 2018

Andrei Iancu
*Director of the United States Patent and Trademark Office*